United States Patent [19]

Gosdowski et al.

[11] Patent Number: 5,013,163
[45] Date of Patent: May 7, 1991

[54] LINEAR UNIT FOR MANIPULATION DEVICES AND THE LIKE

[75] Inventors: Gerhard Gosdowski, Bietigheim-Bissingen; Roland Rappold, Plüderhausen, both of Fed. Rep. of Germany

[73] Assignee: Robert Bosch GmbH, Stuttgart, Fed. Rep. of Germany

[21] Appl. No.: 392,995
[22] PCT Filed: Oct. 21, 1987
[86] PCT No.: PCT/DE87/00542
§ 371 Date: Jul. 24, 1989
§ 102(e) Date: Jul. 24, 1989
[87] PCT Pub. No.: WO88/06246
PCT Pub. Date: Aug. 25, 1988

[30] Foreign Application Priority Data

Feb. 16, 1987 [DE] Fed. Rep. of Germany ....... 3704800

[51] Int. Cl.[5] ............ F16C 23/04; F16C 29/00; F16C 33/00
[52] U.S. Cl. ............................ 384/38; 384/7; 384/41; 384/43; 384/57; 384/59
[58] Field of Search ............. 384/53, 55, 57, 59, 384/35, 39, 40, 41, 42, 43, 44, 45, 7, 38

[56] References Cited

U.S. PATENT DOCUMENTS

| 3,552,806 | 1/1971 | Weasler et al. | 384/45 |
| 3,591,906 | 7/1971 | Leiber | 384/53 X |
| 4,515,415 | 5/1985 | Szenger | 384/44 |
| 4,730,945 | 3/1988 | Luther et al. | 384/45 |

FOREIGN PATENT DOCUMENTS 0180323 5/1986 European Pat. Off. .

Primary Examiner—Daniel P. Stodola
Assistant Examiner—William G. Battista, Jr.

[57] ABSTRACT

A linear unit for manipulation devices and comprising a housing part having a passage therethrough for receiving a spindle sleeve and a cylindrical bore longitudinally intersecting the passage and for receiving the two bearing elements that support the spindle sleeve for displacement in the passage, the cylindrical bore having a longitudinal axis at least partially lying in a plane in which the longitudinal edge of the spindle sleeve and the longitudinal axis of the spindle sleeve lie, and forming an acute feed angle with the longitudinal axis of the spindle sleeve.

8 Claims, 2 Drawing Sheets

LINEAR UNIT FOR MANIPULATION DEVICES AND THE LIKE

BACKGROUND OF THE INVENTION

The invention relates to a linear unit comprising a spindle sleeve and bearing elements that support the sleeve for displacement in the unit housing. In such linear units, the spindle sleeve must be supported so as to be absolutely free from play in consideration of the required high positioning and repeating accuracy of the work cycles. In known linear units of the type, roller bearings with relatively large bearing rollers are arranged at both front ends of a tubular housing part, a plurality of these bearing rollers being adjustable in the radial direction for the purpose of eliminating bearing clearance or adjusting the spindle sleeve. This construction results in high cost of assembling the unit and requires relatively large space.

Summary of the Invention

The object of the invention is to provide a linear unit which is simple with respect to assembling, inexpensive and also economical with respect to space. The object of the invention is achieved by providing a linear unit in which the two bearing elements are constructed in such a way that they do not project out of the housing part. Errors of geometry and alignment in the housing part and spindle sleeve can be easily compensated for by means of the individually adjustable bearing elements.

A particularly compact construction results when every bearing element comprises a planar bearing surface and a plurality of bearing points which lie in a common bearing plane which encloses, with the imaginary axis of the cylindrical supporting surface of the bearing element, the same acute feed and wedge angles as the axis of the housing bore hole with the longitudinal axis of the spindle sleeve, wherein the bearing plane of the bearing element advantageously extends approximately along the entire length of the cylindrical supporting surface. This construction also has the additional advantage that the spindle sleeve can be guided over a longer axial area, so that, when the bearing elements are constructed so as to be correspondingly long, a single axial bearing area can also be sufficient if necessary.

The use of commercially available bearing bodies is possible if every bearing element comprises a guide segment, which is provided with the cylindrical supporting surface, and a bearing body which is constructed so as to be separate from the guide segment and which is inserted to fit in a receptacle of the guide segment and preferably connected with the latter so as to be detachable.

Optimum use is made of the wall of the housing bore hole receiving the two bearing elements for supporting the two guide segments of the bearing elements when the two bearing elements are defined in each instance by a shoulder surface at the longitudinal sides of their guide segments which face one another, the shoulder surface at least approximately enclosing an angle of 45° with the bearing plane.

In another embodiment of the invention it is suggested that localized recesses are provided in the supporting surfaces of the bearing elements and, in a manner corresponding to the latter, in the wall of the housing bore hole, which recesses form hollow spaces which open toward the outer front side of the bearing element and contain a filling material, which is inserted after the adjustment of the bearing elements, for fixing the bearing elements between the housing part and the spindle sleeve in a positive-locking manner and so as to be free from play. A curable plastics material can advantageously serve as filling material. It is accordingly achieved that fastening elements in the form of pins, screws or the like are dispensed with and the bearing elements are fixed in the adjusted position so as to be absolutely free from play and resistant to shaking.

The localized recesses in the wall of the housing bore hole and in the bearing elements which receive the filling material can be advantageously constructed without radial undercuts, so that the bearing elements can be removed from the housing bore holes in the radial direction after removing the spindle sleeve. If the bearing element comprises a bearing body and a guide segment, the bearing body can be exchanged, if necessary, and the new bearing body can be inserted again together with the existing guide segment, whereupon the freedom from play of the spindle sleeve support is ensured again without additional adjusting processes. In addition, steps can also be taken so that the filling material, which is introduced into the hollow spaces and solidified to form dimensionally stable bodies, can likewise be removed from the housing bore hole after the removal of the bearing elements, so that an exchanged bearing element or an exchanged bearing body can be newly adjusted and subsequently fixed again by means of inserting filling material.

In a preferred embodiment form, it is suggested that the spindle sleeve be guided at two longitudinal edges located diametrically opposite one another, by bearing elements which are inserted in cylindrical housing bore holes. By using such an arrangement, the bearing elements can be standardized, the positional tolerances of the guide surfaces at the spindle sleeve can be made less precise and, moreover, a guidance and support of the spindle sleeve at the other longitudinal edges can be dispensed with, so that the spindle sleeve can remain unprocessed in these areas.

The present invention both as to its construction so to its mode of operation, together with additional objects and advantages thereof, will be best understood from the following description of specific embodiments with reference to the appended drawings.

DESCRIPTION OF THE PREFERRED EMBODIMENTS

Figure 1:
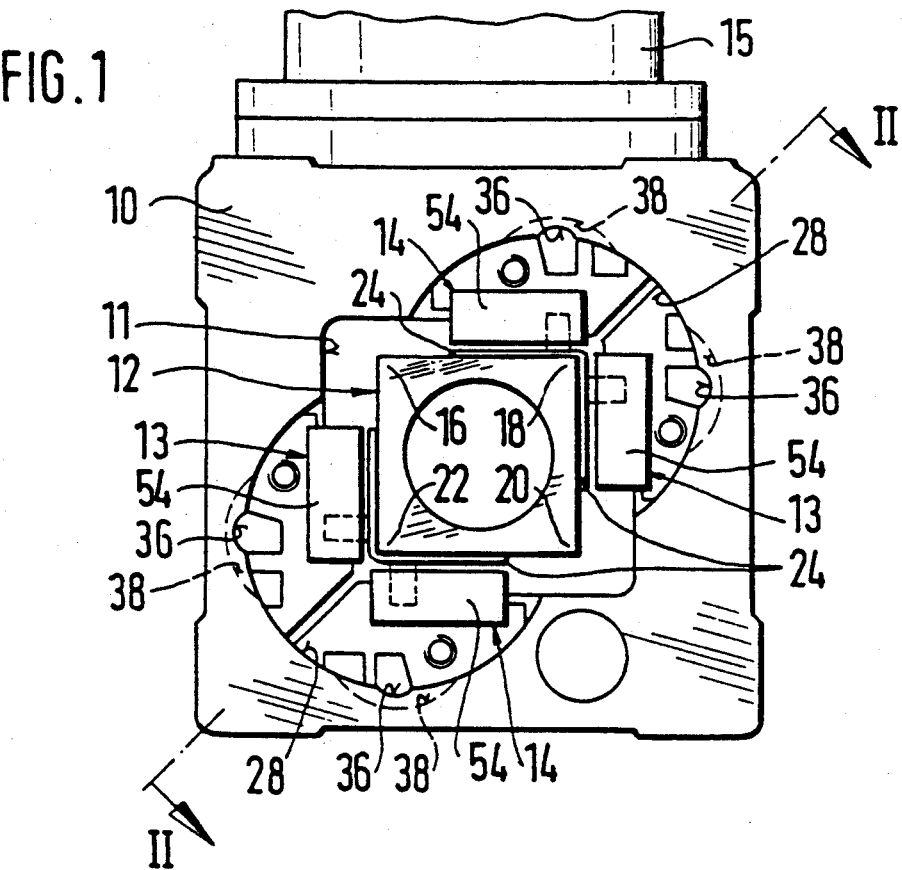
FIG. 1 shows a front view of a linear unit according to the invention.

The linear unit comprises a square housing part 10 which is provided with a central through-opening 11 and in which an elongated spindle sleeve 12 is displaceably supported and guided in each instance by two bearing elements 13 and 14 which are described in more detail below. An electric drive motor 15 sits on the housing part 10 and acts on the spindle sleeve 12 via a gear unit, not shown, and, in so doing, brings about axial relative movements between the spindle sleeve 12 and the housing part 10. The linear unit could also be provided with a pneumatic drive instead of the electric drive motor 14.

The spindle sleeve 12 comprises a tubular drawn part of aluminum which has a square cross-sectional profile on the outside and accordingly comprises four longitudinal edges 16, 18, 20, 22. In addition to the two diametrically opposite longitudinal edges 18 and 22, the spindle sleeve 12 comprises a lining 24 of wear-resistant material, e.g. a steel alloy. Every lining 24 forms a bearing surface which extends along the longitudinal edge 18 and 22, respectively, one of the bearing elements 13 or 14 resting on the bearing surface so as to be free from play. The spindle sleeve 12 is not supported or guided at the two other longitudinal edges 16 and 20 so that the spindle sleeve 12 can be not machined and lined-up in these areas.

Figure 2:
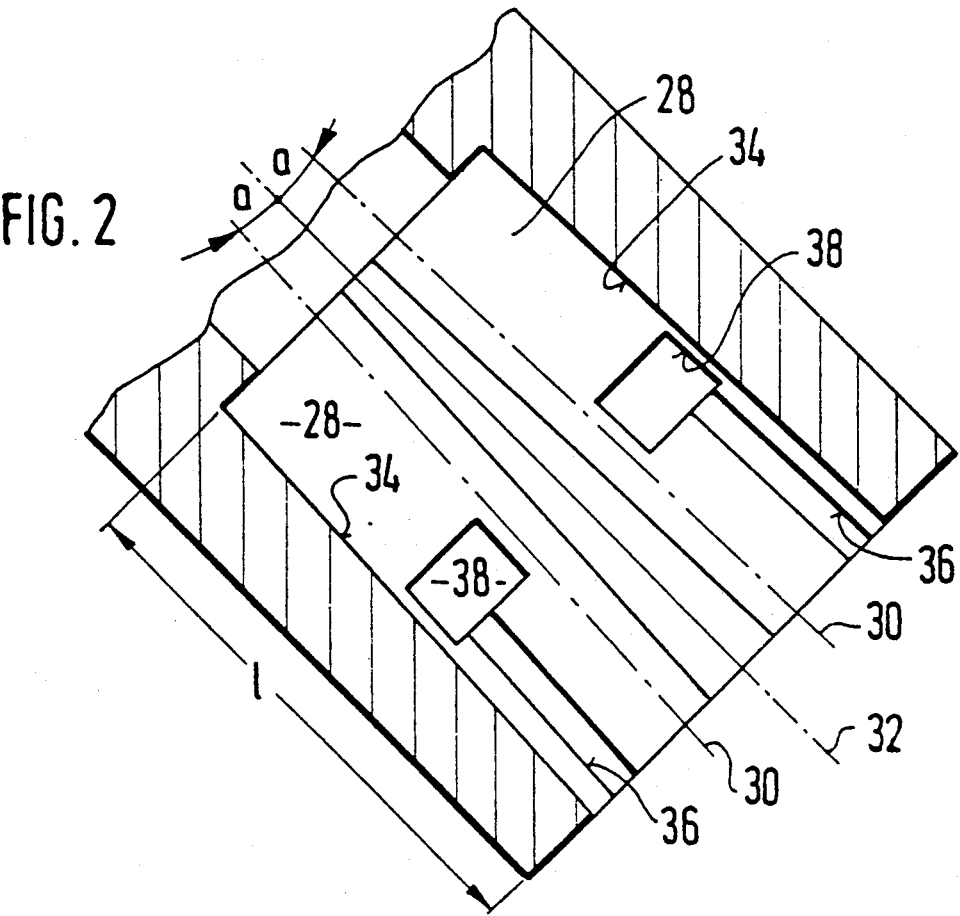
FIG. 2 shows a sectional view alone line II—II in FIG. 1.
Figure 3:
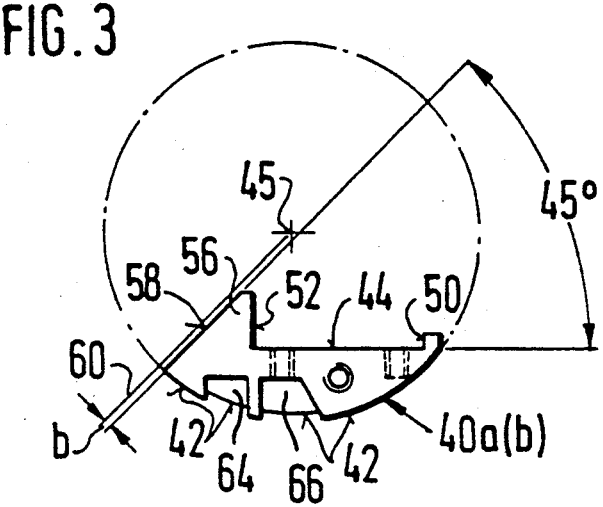
FIG. 3 shows a front view of an individual part of the linear unit according to FIG. 1 in a slightly enlarged scale than in to FIG. 1.
Figure 4:
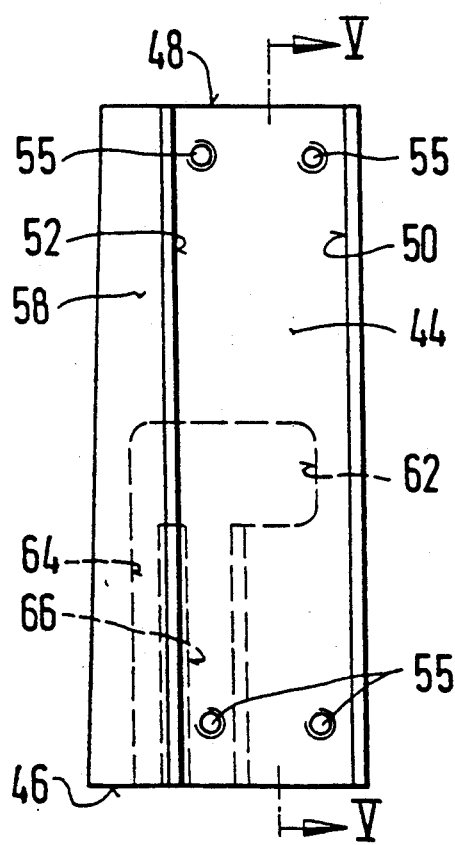
FIG. 4 shows a top view of the individual part according to FIG. 3.
Figure 5:
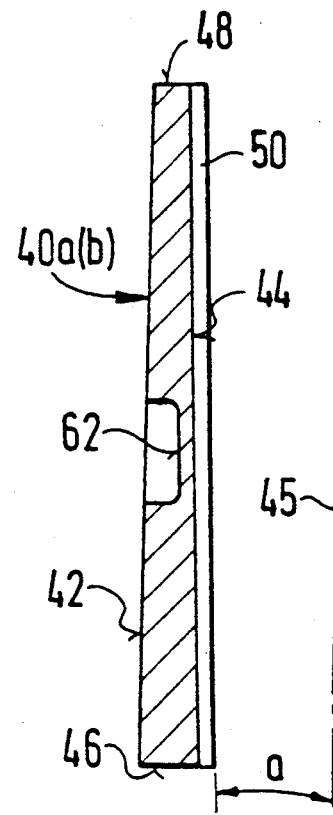
FIG. 5 shows a sectional view along line IV—IV in FIG. 4.

The housing part 10 is provided in the end area on the front side with two cylindrical housing bore holes 28 for the purpose of receiving the bearing elements 13, 14 in pairs, the housing bore holes 28 being located diametrically opposite one another with reference to the through-opening 11 and intersecting the through-opening 11 longitudinally. The bore hole axes 30 (FIG. 2) of the two housing bore holes 28 lie in a diagonal plane receiving the two longitudinal edges 18, 22 of the installed spindle sleeve 12 and, with the longitudinal axis 32 of the spindle sleeve 12 and of the entire linear unit, respectively, enclose an acute feed and wedge angle a. Every housing bore hole 28 has a certain length 1 which is dimensioned in such a way that the bearing elements 13, 14 can be displaced into a position supporting and guiding the spindle sleeve 12 so as to be free from play. In addition, every housing bore hole 28 is provided with two longitudinal grooves 36 which are worked into the bore hole wall 34 and which lead into pocket-like recesses 38 in the bore hole wall 34.

Each bearing element 13, 14 has a guide segment 40a and 40b, respectively, which are constructed in a mirror-inverted manner with respect to one another and whose individual features are therefore designated with the same reference numbers. Every guide element 40a,b has a cylindrical supporting surface 42 which contacts the bore hole wall 34 of the housing bore hole 28 in the installed state. In addition, every guide element 40a,b is provided with a planar support surface 44 which encloses the same feed and wedge angle a relative to the imaginary axis 45 of the cylindrical supporting surface 42 as the bore hole axes 30 relative to the longitudinal axis 32. The direction of the feed and wedge angle a at the guide segment 40a,b is selected in such a way that its front side 46 assigned to the insertion opening of the housing bore hole 28 is wider than the other front side 48 as seen in the radial direction.

The support surface 44 of the guide segment 40a,b is defined at both longitudinal sides in each instance by a shoulder surface 50, 52, which shoulder surfaces 50, 52 extend parallel relative to one another along the entire length of the guide segment 40a,b. The surfaces 44, 50 and 52 enclose a receptacle for a bearing body 54 which, for example, can be a sliding shoe or preferably a revolving rolling shoe of shallow construction and of a commercially available constructional type. The bearing body 54 preferably extends along the entire length of the guide segment 40a,b whose length is adapted to the length 1 of the housing bore hole 28 while taking into consideration the necessary axial displacements during the setting and adjustment of the bearings for eliminating play. The bearing surface of the bearing body 54, which can be formed by a planar, closed sliding surface, and preferably by a plurality of bearing points lying in a common bearing plane at the cylindrical circumference of bearing rollers, is aligned so as to be parallel to the body surface of the bearing body 54 lying at the support surface 44 of the guide segment 40a,b. The bearing body 54 is fastened at the guide segment 40a,b by means of four screws engaging in threaded holes 55.

The shoulder surface 52 of the guide segment 40a,b is formed at a strip-shaped projection 56 whose other longitudinal side is defined by means of a second shoulder surface 58. The latter encloses an angle of 45° with the support surface 44 and is offset by to a small extent b relative to a plane 60 through the imaginary axis 45 of the cylindrical supporting surface 42. A pocket-like recess 62, whose axial position corresponds approximately to that of the recess 38 in the housing bore holes 28, is worked into the support surface 42. Two longitudinal grooves 64, 66 in the support surface 42, which are arranged parallel to one another, lead into the recess 62, which support surface 42 opens out at the front side 46 of the guide segment 40a,b, one of which longitudinal grooves 66 corresponds with a longitudinal groove 36 in the housing bore hole 28.

During the assembly of the parts, the bearing elements 13, 14, which are prefabricated as structural components, are inserted into the housing bore holes 28 in pairs after the insertion of the spindle sleeve 12 into the housing part 10 and are displaced toward the interior of the housing until the spindle sleeve 12 is held between the bearing elements 13, 14 so as to be free from play. Subsequently, the hollow spaces, which are formed by the recesses 38, 62 in the parts, are filled with a hardening filling material, preferably with curable plastics material, wherein the filling is effected e.g. by means of the channels which are formed in the housing bore holes 28 and the guide segments 40a,b by means of the longitudinal grooves 36 and 66. After the hardening of the filling material, the bearing elements 13, 14 are fixed between the spindle sleeve 12 and the housing part 10 in a positive-locking manner, and the spindle sleeve 12 is supported and guided so as to be free from play. The bearing elements 13, 14 can be removed from the housing bore holes 28 in the radial direction without damaging the parts if the spindle sleeve 12 has been removed from the bearing area beforehand.

While the invention has been illustrated and described as embodied in a manipulation device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A linear unit for a manipulation device comprising a housing part having a passage therethrough; a spindle sleeve received in said passage for displacement therein and having a longitudinal axis, at least one longitudinal edge lying in a common plane with the longitudinal axis, and bearing surfaces extending adjacent said at least one longitudinal edge; and two bearing elements supported in said housing part and engaging said bearing surfaces of said spindle sleeve for supporting said spindle sleeve for displacement in said passage of said housing part, said housing part including a cylindrical bore longitudinally intersecting said passage and for receiving said two bearing elements, said cylindrical bore having a longitudinal axis in the common plane in which said longitudinal edge of said spindle sleeve and the longitudinal axis of said spindle sleeve lie, and forming an acute feed angle with the longitudinal axis of said spindle sleeve, and said cylindrical bore having a cylindrical wall, each of said two bearing elements including a guide segment having a cylindrical supporting surface abutting said cylindrical wall.

2. A linear unit as set forth in claim 1, wherein each of said two bearing elements has one of a planar bearing surface and a bearing plane having a plurality of bearing points lying therein, said one of a planar bearing surface and a bearing plane forming with an imaginary axis of said cylindrical supporting surface thereof an acute angle equal to said acute feed angle, said one of a planar bearing surface and a bearing plane extending preferably in an axial direction of said spindle sleeve along substantially the entire length of said cylindrical supporting surface.

3. A linear unit as set forth in claim 2, wherein each of said two bearing elements comprises a guide segment defining said cylindrical supporting surface, said cylindrical supporting surface having a recess, said linear unit further comprising a bearing body removably received in said recess.

4. A linear unit as set forth in claim 3, wherein respective guide segments of the two bearing elements have respective longitudinal sides facing each other and respective shoulder surfaces defining said respective longitudinal sides, each of said shoulder surfaces forming with said one of a planar bearing surface and a bearing plane an angle of substantially 45°.

5. A linear unit as set forth in claim 3, wherein said recesses in said wall and said cylindrical supporting surface are formed without radial undercuts.

6. A linear unit as set forth in claim 3, wherein said spindle sleeve has a rectangular cross-section and two diametrically opposite longitudinal edges, said linear unit further comprising additional two bearing elements so that said spindle sleeve is guided by two pairs of bearing elements, said housing part comprising another cylindrical bore intersecting said passage in which said guide sleeve is received, for receiving said additional two bearing elements.

7. A linear unit as set forth in claim 1, wherein each of said bearing elements and a respective wall portion of said wall of said cylindrical bore include respective recesses forming a space open toward an outer front side of each of said two bearing elements for receiving, after adjustment of a respective bearing element, a filling material for fixing the respective bearing element between said wall and said spindle sleeve and to positively lock the respective bearing element.

8. A linear unit as set forth in claim 7, wherein said filling material comprises a curable plastic material.

* * * * *